May 10, 1938.  C. GROSS  2,116,786
COMBINED ROAD AND RAIL VEHICLE
Filed Dec. 12, 1936  2 Sheets-Sheet 1

INVENTOR
Charles Gross
BY
*Harness, Dickey, Pierce & Hann.*
ATTORNEYS.

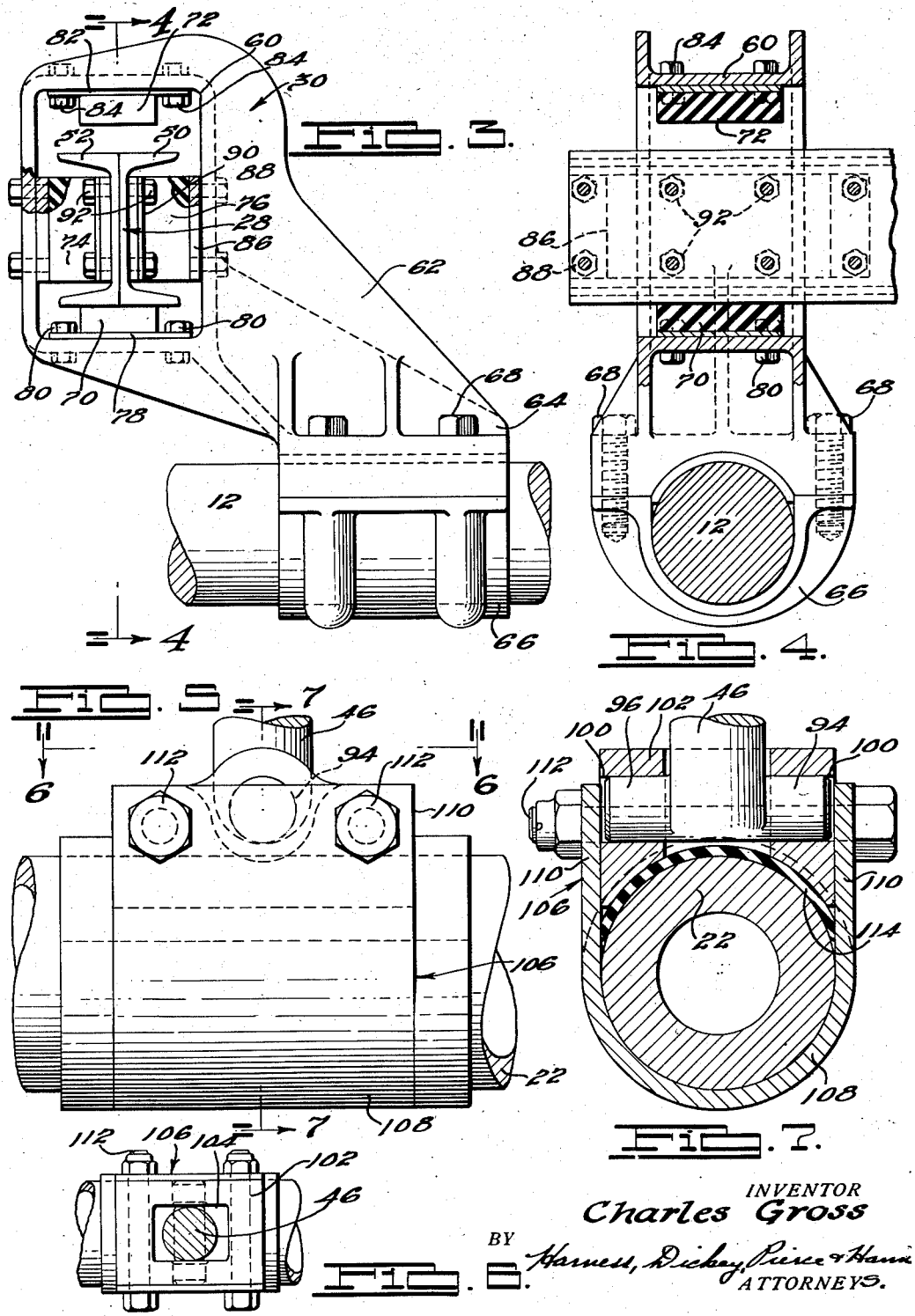

Patented May 10, 1938

2,116,786

UNITED STATES PATENT OFFICE 2,116,786

COMBINED ROAD AND RAIL VEHICLE

Charles Gross, Detroit, Mich., assignor to Transportation Systems Inc., Tulsa, Okla., a corporation of Oklahoma Application December 12, 1936, Serial No. 115,510

10 Claims. (Cl. 105—215)

The present invention relates to combined road and rail vehicles, and in particular provides an improved resilient or floating type connection between the pilot wheel structure and the main supporting structure for such a vehicle.

The co-pending application of Sulo M. Nampa, Serial No. 50,384, filed November 18, 1935 (Case No. 74) and assigned to the assignee of the present application discloses a combined road and rail vehicle of the type to which the present invention is particularly applicable and in connection with which it is illustrated, although it will be understood that in their broader aspects the improvements of the present invention are also applicable to other types of road and rail vehicles. In the co-pending construction, which, so far as the illustrated embodiment of the present invention is concerned, is directed principally to the use of a pair of pilot wheels mounted between the two pairs of main vehicle wheels constituting a four wheeled rear truck, the pilot wheel assembly is suspended from an under-frame, the opposite ends of which are connected to and supported by the two main axles of the truck. Raising and lowering mechanism is connected between the under-frame and the pilot axle so that the pilot wheels may selectively be raised to a position above the level of the roadway to accommodate the vehicle to highway travel, and may be lowered to track engaging position in order to accommodate the vehicle to track travel.

In accordance with the present invention it is proposed to interpose a resilient or floating connection between the main axles and the pilot axle and as illustrated this floating connection consists of one resilient connection between each main axle and the under-frame or yoke, and a second resilient connection between the pilot axle and the means for connecting it to the yoke.

With the above as well as other considerations in view, objects of the present invention are to provide a vehicle adapted for combined road and rail travel and embodying an improved resilient or floating connection between the pilot mechanism therefor and the main structure thereof; to provide such a construction in which a pilot axle is suspended for selective raising and lowering movements between two main axles constituting a main truck of the vehicle; to provide such a construction in which the suspension for the pilot axle includes a yoke or under-frame which extends between and is supported by the main axles; to provide such a construction in which an improved resilient or floating connection is provided between each main axle and the yoke or under-frame; and to provide such a construction in which an additional resilient or floating connection is provided between the pilot axle and the yoke or under-frame.

Further objects of the invention are to provide an improved under-frame adapted particularly for use in a structure of the above stated character, as well as to provide an improved offset bracket for supporting the under-frame from a main axle of the vehicle, in order to clear the differential associated with such main axle; and to provide such a construction in which an improved resilient or floating connection is provided between the yoke or under-frame and the associated bracket.

With the above, as well as other and more specific objects in view, a preferred but illustrative embodiment of the invention is shown in the accompanying drawings throughout which corresponding reference characters are used to designate corresponding parts and in which:

Fig. 3 is a detail view taken along the line 3—3 of Fig. 1;

Fig. 4 is a detail view taken along the line 4—4 of Fig. 3;

Fig. 5 is a fragmentary detail view showing the connection between the pilot axle and the raising and lowering mechanism therefor;

Fig. 6 is a detail view taken along the line 6—6 of Fig. 5; and,

Fig. 7 is a detail view taken along the line 7—7 of Fig. 5.

Figure 1:
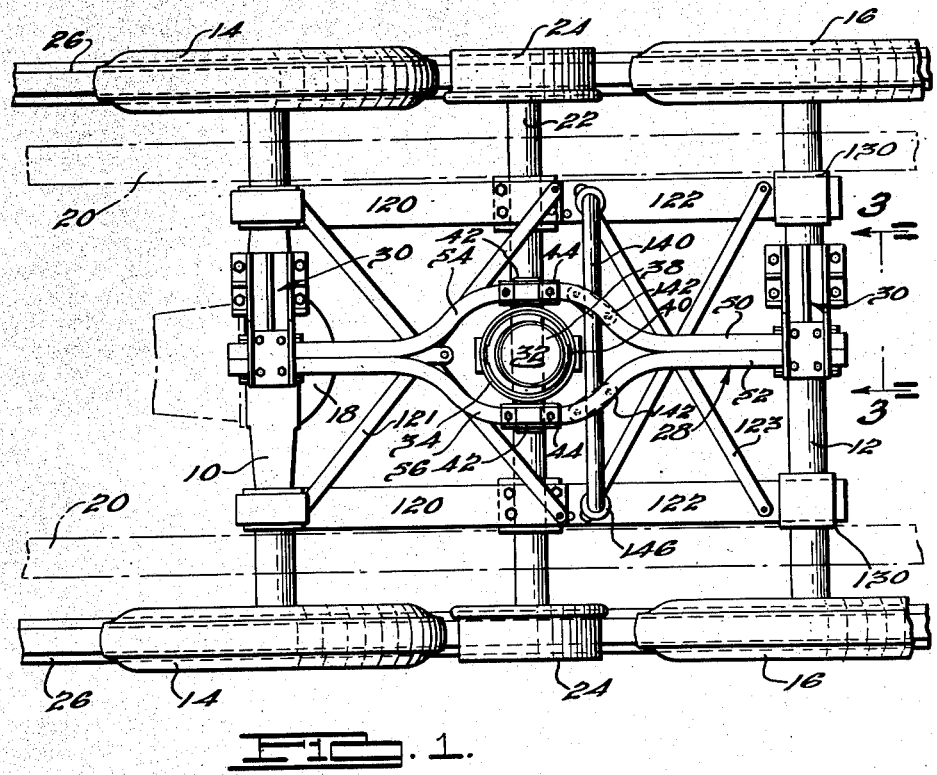
Figure 1 is a top plan view of the rear end assembly of a combined road and rail vehicle embodying the invention.
Figure 2:
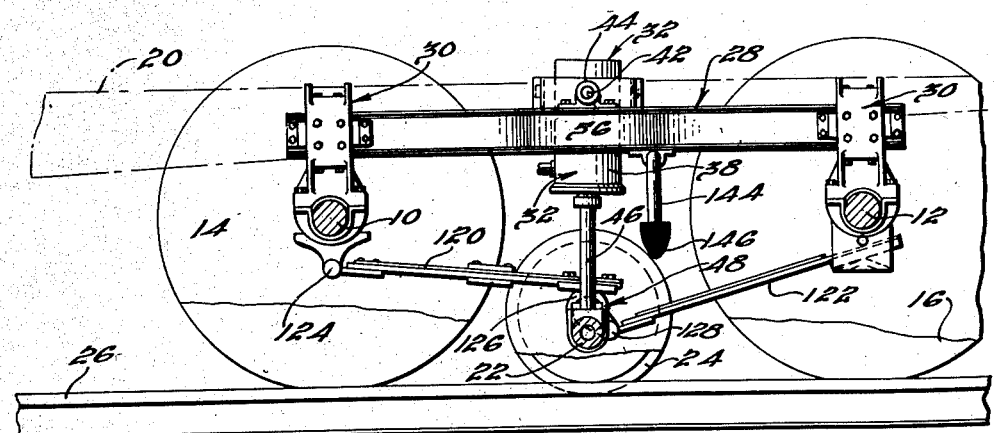
Fig. 2 is a view in side elevation corresponding to Fig. 1.

Referring particularly to Figs. 1 and 2 the illustrated structure includes a pair of related main axles 10 and 12 and associated pairs of main road wheels 14 and 16, respectively, which function during road or highway travel to support the vehicle in the usual way. The main axle 10 is provided with an illustrative differential 18, into which a conventional drive shaft (not shown) may extend, to drive the vehicle in the usual way. Any suitable or conventional spring suspension (not shown) may be provided to connect the two main axles 10 and 12 to the illustrative vehicle frame 20. No showing is made of the front wheel structures for the vehicle, it being appreciated that the usual dirigible wheels may be provided and that a pilot wheel assembly may be provided for the front wheels in the manner described, for example, in the patent to David W. Main, No. 2,002,901, granted May 28, 1935 and assigned to the assignee of the present application.

The pilot mechanism for the rear wheels 14 and 16 includes the pilot axle 22 and the pair of flanged wheels 24 carried thereby and of appropriate gauge to cooperate with the rails 26 of a conventional railway. The gauge of the main wheels is illustrated as being such that during track travel the main wheels 14 and 16 also ride upon the rails 26, although in certain instances, other relations are practicable.

The pilot axle and consequently the pilot wheels 24 are suspended from the main vehicle by a yoke or under-frame 28 which in turn is directly supported by the main axles 10 and 12 by offset brackets 30, of similar construction. The offset bracket arrangement is particularly desirable in connection with the main axle 10, in order to clear the housing of the differential 18 and is illustrated as also used in connection with the axle 12 in the interests of uniformity of manufacture.

The pilot axle 22 is shown as connected to the yoke 28 through a hydraulic raising and lowering member 32 of the type described in the above identified co-pending application, and characterized in that a universal joint is provided both between the pilot axle and the member 32 and between the member 32 and the yoke 28. It will be appreciated, however, that other raising and lowering mechanism, such for example as the universal type jack also shown in the co-pending application may be used instead. The universal joint between the yoke 28 and the raising and lowering mechanism 32 is formed by providing the member 32 with a surrounding collar 34, to which the cylinder 38 of the mechanism 32 is pivotally connected by trunnions 40, and by pivotally supporting the trunnions 42 which project from the collar 34 upon the yoke by means of the bearing bosses 44. The universal joint between the piston rod 46 and the pilot axle is described in more detail hereinafter in connection with Figs. 5, 6 and 7 and is designated as a whole as 48 in Fig. 2. Suitable means (not shown) may be provided to control the admission to and the exhaustion from the cylinder 38 of fluid pressure in order to effect the lowering of the pilot wheels 24 to the position shown in Fig. 2, in which they engage the rails 26 and act to guide and maintain the main wheels 16 thereon, or to raise the pilot wheels 24 to a position in which they do not interfere with normal highway or road travel of the vehicle.

Referring to Figs. 3 and 4, as well as to Figs. 1 and 2, the yoke 28 is formed of a pair of channel members 50 and 52, disposed in back to back relation, each of which is outwardly bent intermediate the ends to provide the portions 54 and 56 which receive the raising and lowering mechanism 32 between them. This construction is one which may be very economically produced, and is extremely rigid and effective. Each bracket 30 includes a rectangularly apertured portion 60 within which the associated end of the yoke 28 is received, an offset portion 62, and a yoke portion 64, which fits over the associated main axle. A yoke 66 is associated with each bracket portion 64 and may be secured thereto by the studs 68. The portions 64 and 66 thus form a non-rotative fixed connection between each bracket 30 and the associated main axle.

The connection between each end of the yoke 28 and the associated bracket portion 60 is a resilient one, and is composed in the illustrated embodiment of four rubber blocks 70, 72, 74 and 76. The lower rubber block 70 is permanently bonded, as by vulcanizing, to a backing plate 78 which in turn is secured to the lower surface of the rectangular aperture by studs 80. Block 70 acts to resiliently support the associated end of the yoke 28, which normally rests thereupon. The upper block 72 is similarly bonded to a backing plate 82, secured to the bracket 30 by studs 84. Block 72 acts as a buffer, and is normally spaced somewhat above the upper edge of the associated end of the yoke 28.

The block 76 is permanently bonded to a backing plate 86 which is secured to the associated side wall of the rectangular aperture by studs 88 which pass through the backing plate but do not pass into the body of the block 76 and thus do not restrict to modify the normal resiliency or flexibility of the block. The inner edge of the block 76 is similarly bonded to a backing plate 90 which projects beyond the marginal edge of the block 76 as in the case of the backing plates 78 and 82, and which is secured to the web of the yoke 28 by studs 92. The remaining block 74 is connected between the yoke 28 and bracket 30 in the manner just described with reference to block 76.

When the pilot wheels 24 are in the raised position, it will be appreciated that the reaction of the yoke 28 on each main axle and on brackets 30 is in a downward direction. Under these conditions, the ends of the yoke rest upon the lower rubber block 70 associated with each bracket 30, which block in conjunction with the lateral blocks 74 and 76, acts to resiliently and floatingly support the pilot axle assembly. Road shocks to which the vehicle is subjected during road travel, accordingly, are resiliently transmitted to the pilot assembly, and also any minor jolting or oscillation of the pilot assembly during road travel is resiliently transmitted to the bracket 30. The resulting assembly is, therefore, very quiet and satisfactory in operation.

During rail travel, however, during which time the pilot assembly is urged into the rail engaging position with a force determined by the operation of the raising and lowering mechanism 32, and carries a corresponding predetermined portion of the vehicle load, the reaction between the yoke 28 and the brackets 30 is in an upward direction. Under these conditions, the ends of the yoke 28 tend to move upwardly and away from the lower blocks 70, which movement is resisted by the lateral blocks 74 and 76. The adjustment and assembly of the parts is preferably such that with the normal load on the vehicle and a normal proportion thereof being taken by the pilot wheels, the ends of the yoke 28 rest upon and still slightly compress the lower blocks 70. In the event one or the other of the main axles is lifted relative to the pilot axle 32, as by encountering a track irregularity, the associated end of the yoke 28 momentarily moves downwardly relative to said main axle, correspondingly momentarily depressing the lower block 70 and flexing the lateral blocks 74 and 76. On the other hand, in the event the pilot axle is caused to lift relative to the main wheels, as in the event the pilot wheels 24 encounter a track irregularity, one or both ends of the yoke 28 may momentarily move upwardly relative to the associated main axle, and may in certain cases be lifted entirely free of the lower supporting block 70 and be moved into engaging relation to the upper or buffer block 72, which upward movement, as before, is resisted by the lateral blocks 74 and 76.

The resilient or floating connection as described above also readily accommodates the structure to the changes in longitudinal spacing between the main axles 10 and 12 which occur from time to time during the operation of the vehicle, and are permitted by the conventional spring suspensions between the main axles and the vehicle frame. Any such movement, as will be appreciated, is readily accommodated by the lateral rubber blocks 74 and 76 individual to each mounting bracket 30, since these blocks are enabled to flex in the required longitudinal direction, as well as in the vertical direction.

The just described resilient mounting is also effective to afford a universal joint action between each end of the yoke 28 and the associated main axle. It will be appreciated that from time to time one pilot wheel 24 or one main wheel 24 may be lifted from its associated rail without a corresponding lifting of the other pilot or main wheel. In this event, the main axle or the pilot axle tends to rotate relative to the rest of the assembly about the opposite main or pilot wheel as a center, causing a rotative movement of the yoke 28 relative to one or both brackets 30. This rotative movement is readily accommodated with the floating or resilient mounting of the present construction, as will be appreciated.

Referring particularly to Figs. 5, 6 and 7, the lower end of the piston rod 46 associated with the raising and lowering mechanism 32 is formed as a T, with the two trunnions 94 and 96 projecting therefrom in axially aligned relation. The trunnions 94 and 96 are rotatively received in bearing openings 98 and 100 provided therefor in an upper yoke member 102, which rests upon the upper side of the pilot axle 22. The yoke 102 is also provided with a slotted aperture 104 which accommodates the piston rod 46 and permits a tilting thereof about the trunnions 94 and 96 as an axis. The joint 48 is completed by a U-shaped yoke 106, the lower arcuate portion 108 of which surrounds the pilot axle 22 and the spaced substantially parallel legs 110 of which are secured to the respectively opposite sides of the yoke 102 by studs 112. Preferably and in accordance with the present invention, a pad of rubber 114 is interposed between the pilot axle 22 and the yoke 102, and a corresponding pad may, if desired, be interposed between the axle 22 and the portion 108 of the member 106. The pad 114, as will be appreciated, acts to provide a resilient yielding connection between the joint 48 and the pilot axle 22, which, in conjunction with the previously described resilient connections for the bracket 30, affords an entirely resilient, floating mounting between the pilot axle 22 and the vehicle.

The connection between the yoke 102 and the clamp 106 is such that these members, as well as the pad 114, which is preferably bonded to the yoke 102, may rotate relatively freely relative to the pilot axle 22. Oscillation of piston rod 46 in one plane relative to pilot axle 22, accordingly, is accommodated by the pivotal connection between the trunnions 94 and 96 and the bearing openings 100 provided therefor, and, oscillation in a plane at right angles to the just mentioned plane is accommodated by the rotative connection between the pilot axle 22 and the strap 106 and pad 114.

Referring again to Figs. 1 and 2, the means illustrated in the present instance for maintaining the pilot wheels 24 in accurate lateral alignment with the main wheels 14 and 16, while permitting free vertical movement thereof relative to the main wheels 14 and 16, follows the disclosure of the above identified co-pending application and comprises the two pairs of alignment straps 120 and 122. The straps 120 are pivotally connected to the main axle 10 as by a bearing 124 individual thereto and is also pivotally connected to the pilot axle 22 by the assembly including a yoke 126 individual thereto. The remaining alignment straps 122 are pivotally connected to the pilot axle 22 through a pivotal connection 128 individual thereto, and are provided with a sliding connection with the main axle 12 through the saddles 130 individual to each other. The saddles 130 are rigidly secured to the main axle 12 and act to prevent movement of the straps 122 axially of shaft 12, while permitting sliding movement of the straps in a direction at right angles to the axis of axle 12. This sliding accommodates the minor increases and decreases in the spacing between the main axles 10 and 12 which occur during the operation of the vehicle, and are permitted by the conventional spring suspension (not shown) between each main axle and the frame of the vehicle. If desired, and as illustrated, struts 121 and 123 may be extended between the opposite sides of the aligning frame comprising the alignment straps 120 and 122, in order to give additional strength thereto.

A further feature of the present construction resides in the provision of an economically manufactured and applied bumper to limit upward movement of the pilot wheels 24. This bumper is illustrated in Figs. 1 and 2 as comprising a bar 140, supported in non-rotative relation upon the under-frame or yoke 28 by brackets 142, and being provided with downwardly projecting end portions 144 disposed in alignment with the alignment straps 122. These downwardly projecting portions 144 are provided with rubber bumpers 146 to cushion the engagement thereof by the alignment straps 122.

Although a specific embodiment of the invention has been described in detail, it will be appreciated that various modifications in the form, number and arrangement of the parts thereof may be made within the spirit and scope of the invention.

What I claim is:

1. A combined road and rail vehicle having a pair of main axles and wheels associated therewith forming a rear truck for said vehicle and a pilot axle and a pair of pilot wheels associated therewith for guiding said vehicle during rail travel and including, in combination, raising and lowering mechanism for said pilot wheels, means connecting said mechanism to said pilot axle, a supplemental frame member, means connecting said raising and lowering mechanism to said supplemental frame member, and resilient means connecting said supplemental frame member to said main axles.

2. A combined road and rail vehicle having a pair of main axles and associated main wheels forming a rear truck and having a pilot axle and associated pilot wheels for guiding said vehicle during rail travel, and including, in combination, raising and lowering mechanism connected to said pilot axle, and means including resilient means and a supplemental frame member extending between said main axles for resiliently supporting said raising and lowering mechanism upon said main axles.

3. A combined road and rail vehicle having main wheels and pilot wheels for guiding said main wheels during rail travel, and including, in combination, raising and lowering mechanism connected to said pilot wheels, a supplemental frame member connected to said raising and lowering mechanism, and means including a resilient member for connecting said supplemental frame member to said vehicle for limited universal movement with respect thereto.

4. A combined road and rail vehicle having a pair of main axles and associated wheels forming a rear truck and having a pilot axle and associated pilot wheels for guiding said main truck during rail travel, and including, in combination, raising and lowering mechanism for said pilot wheels and connected to said pilot axle, a supplemental frame extending between said main axles and connected to said raising and lowering mechanism, and means connecting said supplemental frame to said main axles for limited universal movement with respect thereto.

5. A combined road and rail vehicle having a pair of main axles and associated wheels forming a rear truck and having a pilot axle and associated pilot wheels for guiding said main truck during rail travel, and including, in combination, raising and lowering mechanism for said pilot wheels and connected to said pilot axle, a supplemental frame extending between said main axles and connected to said raising and lowering mechanism, and resilient cushioning means for connecting said supplemental frame member to said main axle for limited universal movement with respect thereto.

6. A combined road and rail vehicle having a pair of main axles and associated wheels forming a rear truck and having a pilot axle and associated pilot wheels for guiding said vehicle during rail travel, one of said main axles including a differential, and including, in combination, raising and lowering mechanism for said pilot wheels and connected to said pilot axle, a supplemental frame extending between said main axles and connected to said raising and lowering mechanism, and means including an offset bracket engageable with said one main axle in offset relation to said differential and disposed to support the supplemental frame at the axial center of said main axle.

7. A combined road and rail vehicle having a pair of main axles and associated wheels forming a double rear truck and having a pilot axle and pilot wheels for guiding said main wheels during rail travel, and including, in combination, raising and lowering mechanism for said pilot wheels connected to said pilot axle, a supplemental frame for supporting said raising and lowering mechanism, and a bracket individual to each main axle connected thereto for supporting said supplemental frame therefrom, each of said brackets including a journal opening, and a plurality of resilient blocks disposed within said opening for resiliently supporting said supplemental frame.

8. A combined road and rail vehicle including, in combination, a pair of main axles and associated wheels forming a rear truck for said vehicle and a pilot axle and pilot wheels for guiding said vehicle during rail travel, and including, in combination, raising and lowering mechanism for said pilot wheels, a supplemental frame for supporting said raising and lowering mechanism upon said main axles, a universal connection between said raising and lowering mechanism and said pilot axle, a universal connection between said raising and lowering mechanism and said frame, and a universal connection between said frame and each of said main axles, certain of said universal connections including resilient cushioning means.

9. In a combined road and rail vehicle having a pair of main axles and wheels associated therewith forming a rear truck, a pilot axle and pilot wheels associated therewith for guiding said vehicle during rail travel, and means for raising and lowering said pilot wheels, the combination of a frame for supporting said raising and lowering mechanism upon said main axles, said frame comprising a pair of channel members disposed in back-to-back relation, each channel member having an outwardly bowed portion intermediate its end to define an opening to receive said raising and lowering mechanism, and means for connecting the opposite ends of said frame to said main axle.

10. A combined road and rail vehicle having main wheels and pilot wheels for guiding said main wheels during rail travel and including, in combination, raising and lowering mechanism for said pilot wheels, a supplemental frame member for supporting said raising and lowering mechanism upon said vehicle, a universal connection between said raising and lowering mechanism and said pilot axle, a universal connection between said raising and lowering mechanism and said frame, and a universal connection between said frame and said vehicle, certain of said universal connections including resilient cushioning means.

CHARLES GROSS.